(12) United States Patent
Foster et al.

(10) Patent No.: US 12,528,946 B2
(45) Date of Patent: Jan. 20, 2026

(54) YELLOW AND MAGENTA DONOR FORMULATIONS FOR INCREASED RED VIVIDNESS

(71) Applicant: Kodak Alaris, Inc., Rochester, NY (US)

(72) Inventors: David G. Foster, West Henrietta, NY (US); Donald M. Reiman, Caledonia, NY (US); Jacob Pylypciw, Rochester, NY (US); Michael H. Schild, Honeoye Falls, NY (US)

(73) Assignee: Kodak Alaris LLC, Rochester, NY (US)

( * ) Notice: Subject to any disclaimer, the term of this patent is extended or adjusted under 35 U.S.C. 154(b) by 0 days.

(21) Appl. No.: 18/633,903

(22) Filed: Apr. 12, 2024

(65) Prior Publication Data

US 2024/0343908 A1    Oct. 17, 2024

Related U.S. Application Data

(60) Provisional application No. 63/459,136, filed on Apr. 13, 2023.

(51) Int. Cl.
| | | |
|---|---|---|
| *C09B 67/00* | (2006.01) | |
| *C08K 5/00* | (2006.01) | |
| *C08L 1/14* | (2006.01) | |
| *C09B 67/22* | (2006.01) | |

(52) U.S. Cl.
CPC ........ *C09B 67/0052* (2013.01); *C08K 5/0016* (2013.01); *C08L 1/14* (2013.01); *C09B 67/0041* (2013.01)

(58) Field of Classification Search
CPC ............ C09B 67/0052; C09B 67/0041; C09B 67/0051; C08K 5/0016; C08L 1/14
USPC ............................................................ 8/639
See application file for complete search history.

(56) References Cited

U.S. PATENT DOCUMENTS

| | | | |
|---|---|---|---|
| 4,920,092 A | 4/1990 | Davey | |
| 5,139,598 A | 8/1992 | Chou | |
| 5,236,739 A | 8/1993 | Chou | |
| 7,312,012 B1 * | 12/2007 | Diehl | ..................... B41M 5/392 |
| | | | 503/227 |

FOREIGN PATENT DOCUMENTS

| | | | |
|---|---|---|---|
| JP | 2022 064631 | 4/2022 | |
| WO | 2006/068823 | 6/2006 | |
| WO | WO 2007076002 A2 * | 7/2007 | .......... B41M 5/3858 |

OTHER PUBLICATIONS

STIC Search Reprt dated Mar. 21, 2025.*
International Search Report and Written Opinion issued in related PCT Application No. PCT/US24/24338, dated Aug. 21, 2024.

* cited by examiner

*Primary Examiner* — Eisa B Elhilo
(74) *Attorney, Agent, or Firm* — HOGAN LOVELLS US LLP

(57) ABSTRACT

Yellow and magenta donor formulations that produce higher quality prints with fewer defects. The yellow and magenta formulas can be combined to form a red color representation with higher vividness and gamut.

19 Claims, 9 Drawing Sheets
(9 of 9 Drawing Sheet(s) Filed in Color)

YELLOW AND MAGENTA DONOR FORMULATIONS FOR INCREASED RED VIVIDNESS

CROSS-REFERENCE TO RELATED APPLICATIONS

This application claims priority to and the benefit of U.S. Provisional Patent Application No. 63/459,136, filed Apr. 13, 2023, which is incorporated by reference herein in its entirety.

FIELD OF THE DISCLOSURE

Described herein are embodiments of yellow and magenta donor formulations. The yellow and magenta donor formulations provide better and more consistent prints with fewer defects. Additionally, the combination of the yellow and magenta donor can result in a red color with greater vividness.

BACKGROUND OF THE DISCLOSURE

There are many ways of forming an image. For example, images can be formed through thermal transfer of dyes and silver halide image development.

To form any printed image, the image can be chemically developed from film, developed from an electronic signal generated from a digital capture device, or by scanning a film. For thermal printing, electronic signals indicating appropriate colors are used to produce cyan, magenta, yellow, and black color signals. These signals are then transmitted to a printer where colored material is transferred to an appropriate receiver element. A color hard copy is thus obtained that corresponds to the original image.

The dye donor layer of a thermal dye donor element can be prepared by standard coating or printing techniques, for example, gravure process, spin-coating, solvent-coating, extrusion coating, or other methods known to practitioners in the art. Other methods of forming the dye donor layer can include vacuum deposition as disclosed, for example, in U.S. Pat. Nos. 5,139,598 and 5,236,739, both to Chou et al.

Classic dye donor layer coating or printing techniques typically use of one or more of solvents, plasticizers, binders, or other additives to provide various characteristics, such as desired viscosity, adhesion, or crystallinity. This increases the cost and complexity of the dye donor layer.

The formulation of the individual donor colors contributes to the quality and color range of the printed image. Previously used color formulations can result in the generation of crystals within the donor formulation. Certain crystals can form due to increased storage times at higher temperatures and can transfer to the printed images. This can result in defects in the image which can be seen upon close inspection of the image.

Additionally, crystals can form when the dye ratios are unoptimized. This can result in large crystal formations which can form regions of low donor density within the printed image. Additionally, certain formulations can result in the formation of high concentration spots on an image. Both of these can result in unwanted defects present in the production of printed images with certain cyan, magenta, and yellow formulations.

Another aspect of donor formulations is the relative vibrancy of colors that the formulations can produce. Vibrancy is associated with the intensity of color reproduction can be produced by any combinations of dye colorants. Generally, more vibrant colors are more desirable for human viewing and donor combinations resulting in greater vibrancy are beneficial and more accurately reproduce the actual image.

Color is measured in a CIELAB color space which results in a three-dimensional model of color space. The three dimensions are L, a, and b where a is the axis relative to red and green colors, b is the axis relative to blue and yellow colors, and L is a lightness value. It is common to take slices of the three-dimensional model at different lightness values to create a two-dimensional plane.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY OF THE DISCLOSURE

Figure 1:
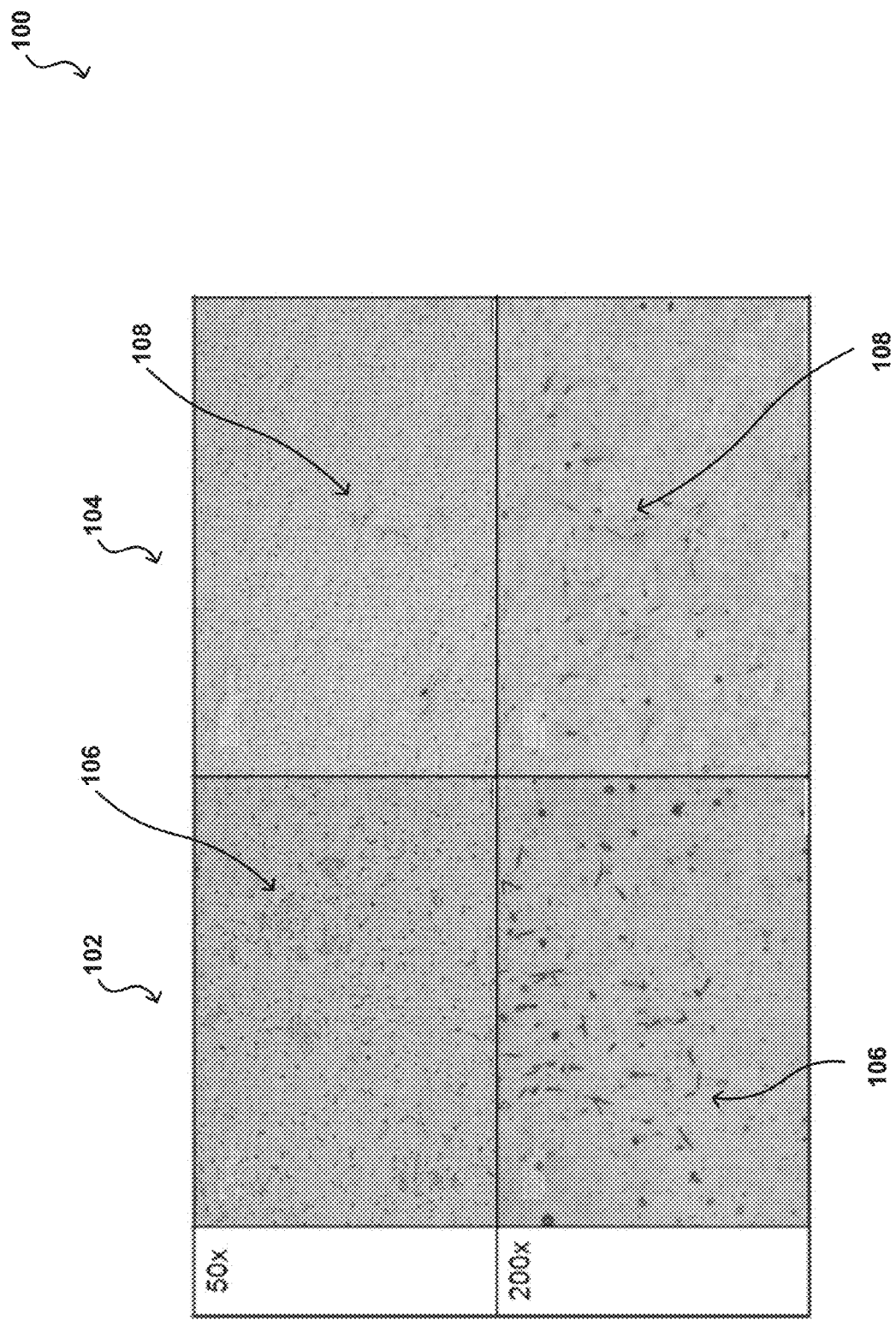
FIG. 1 illustrates a representation of a comparison between a prior art yellow donor and a yellow donor, in accordance with embodiments of the present disclosure.

A first embodiment of the present disclosure provides for a yellow donor. The yellow donor can be comprised of a solvent mixture of approximately 79% toluene, 20% methanol, and 1% cyclopentanone. The yellow donor can further include at least three yellow dyes, cellulose acetate propionate, an appropriate plasticizer, and spacer beads. A first yellow dye can have a Chemical Abstracts Service (CAS) number of 125888-49-5 and a structure of:

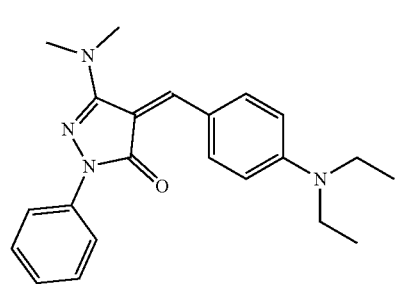 [SMILES: CCN(CC)c1ccc(/C=C2\C(=O)N(c3ccccc3)N=C2N(C)C)cc1]

A second yellow dye can have a CAS number of 61969-52-6 and a structure of:

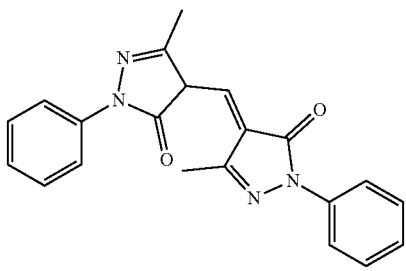 [SMILES: CC1=NN(c2ccccc2)C(=O)/C1=C/C1C(=O)N(c2ccccc2)N=C1C]

A third yellow dye can have a CAS number of 104244-10-2 and a structure of:

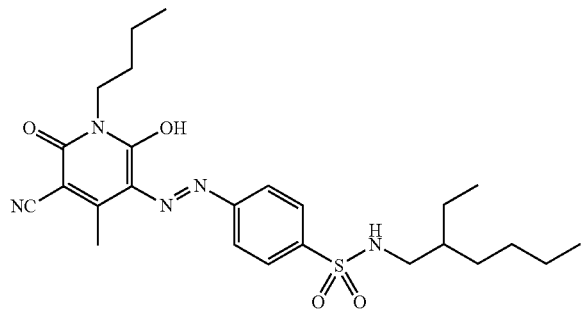 [SMILES: CCCCC(CC)CNS(=O)(=O)c1ccc(/N=N/c2c(C)c(C#N)c(=O)n(CCCC)c2O)cc1]

The yellow donor may have improved crystallization resistance, which may be based, at least in part, on the presence of the third yellow dye. As a result, crystallization may be reduced at increased temperatures. Crystallization can result in areas of discoloration and visible crystal artifacts on the final image. The addition of the third yellow dye can reduce crystallization and the resultant discoloration and artifacts on the image. Accordingly, systems and methods provide for an improved yellow donor compared to existing approaches to generate improved output images.

A second embodiment of the present disclosure provides for a magenta donor. The magenta donor can be comprised of an appropriate solvent mixture, for example, a solvent ratio of approximately 79% toluene, 20% methanol, and 1% cyclopentanone. The magenta donor can further include at least three magenta dyes, cellulose acetate propionate, an appropriate plasticizer, and spacer beads. A first magenta dye can have a CAS number of 186030-51-3 and a structure of:

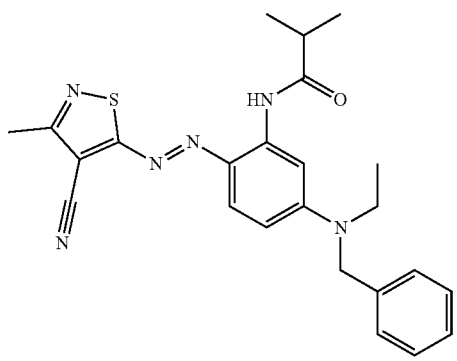 [SMILES: CCN(Cc1ccccc1)c1ccc(/N=N/c2snc(C)c2C#N)c(NC(=O)C(C)C)c1]

A second magenta dye can have a CAS number of 112940-69-9 and a structure of:

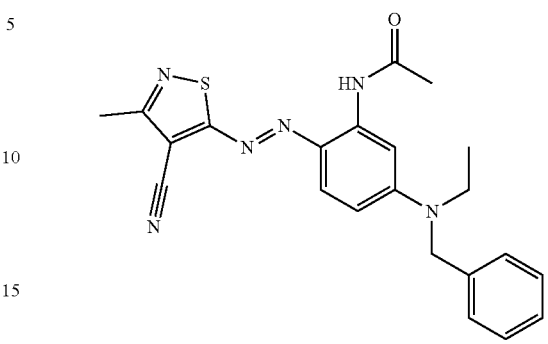

A third magenta dye can have a CAS number of 509-34-2 and a structure of:

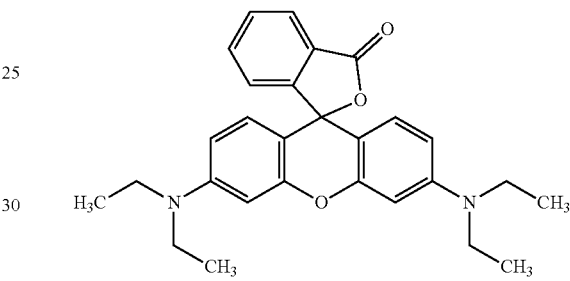

The magenta donor formulation may have improved crystallization resistance, which may be based, at least in part, on the presence of the third magenta dye. As a result, large crystal formation may be reduced, which can result in low density regions of donor after the image is formed. The donor formulation can also reduce the occurrence of red spotting on the final products. Accordingly, systems and methods provide for an improved magenta donor compared to existing approaches to generate improved output images.

The combined yellow and magenta formulations can further result in increased vividness and color gamut. The magenta donor alone can have increased vividness and color gamut. In combination with the yellow donor, the resulting red color can further have increased vividness over prior art donor formulations.

DETAILED DESCRIPTION

The use of numerical values in the various ranges specified herein, unless otherwise expressly indicated otherwise, are considered to be approximations as though the minimum and maximum values within the stated ranges were both preceded by the word "about." In this manner, it should be understood that slight variations above and below the stated ranges can be used to achieve substantially the same results as the values within the ranges. Additionally, the disclosure of these ranges is intended as a continuous range including every value between the minimum and maximum values.

Yellow Donor Formulation

A first embodiment of the present disclosure provides for a yellow donor with reduced defects and greater vibrancy. The yellow donor can be comprised of a solvent mixture of approximately 79% toluene, 20% methanol, and 1% cyclopentanone. In addition to the solvent mixture, the yellow donor can have a formulation according to Table 1 below. Units are provided in mg/ft2 which is an indication of surface density of the various aspects of the yellow donor. The values are based on a single laydown of the donor onto a print medium. The thickness of the single laydown of the donor can be between about 0.25 to 0.75 microns.

TABLE 1

|  | Minimum | Maximum |
| --- | --- | --- |
| First Yellow Dye | 12.40 mg/ft$^2$ | 16.40 mg/ft$^2$ |
| Second Yellow Dye | 3.67 mg/ft$^2$ | 4.85 mg/ft$^2$ |
| Third Yellow Dye | 1.74 mg/ft$^2$ | 2.30 mg/ft$^2$ |
| Cellulose Acetate Propionate | 16.57 mg/ft$^2$ | 21.92 mg/ft$^2$ |
| Plasticizer | 2.61 mg/ft$^2$ | 3.45 mg/ft$^2$ |
| Spacer Beads | 0.296 mg/ft$^2$ | 0.391 mg/ft$^2$ |

The first yellow dye can have a CAS number of 125888-49-5. The structure of the first yellow dye can be:

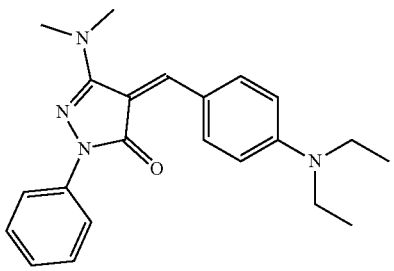 [SMILES: CCN(CC)c1ccc(/C=C2\C(=O)N(c3ccccc3)N=C2N(C)C)cc1]

The second yellow dye can have a CAS number of 61969-52-6. The structure of the second yellow dye can be:

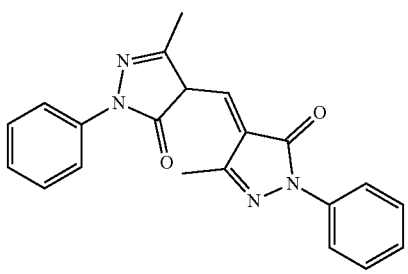 [SMILES: CC1=NN(c2ccccc2)C(=O)/C1=C/C1C(=O)N(c2ccccc2)N=C1C]

The third yellow dye can have a CAS number of 104244-10-2. The chemical structure of the third yellow dye can be:

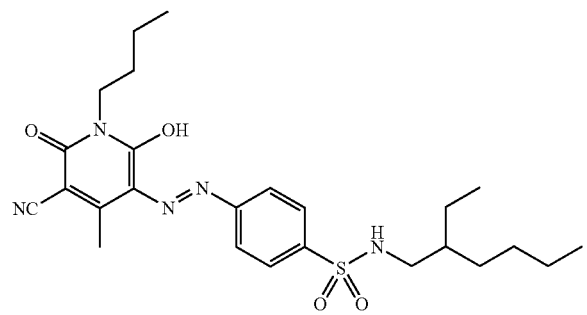 [SMILES: CCCCC(CC)CNS(=O)(=O)c1ccc(/N=N/c2c(C)c(C#N)c(=O)n(CCCC)c2O)cc1]

The cellulose acetate propionate can be used to form a film for the donor. The cellulose acetate propionate can be CAP-482-20. The cellulose acetate propionate can include approximately 48% propionyl by weight, 1.7% hydroxyl by weight, and 1.3% acetyl by weight.

The plasticizer can be high molecular weight plasticizer. The plasticizer can be Paraplex G-25. The Paraplex G-25 can be a polyester sebacate.

The spacer beads can be resin particles within the donor. The spacer beads can have an average particle diameter of about 0.5-6 microns. In some embodiments, the spacer beads can have average particle diameters between about 0.5-3.05 microns.

The addition of the third yellow dye can improve crystallization resistance within the donor. Crystallization can occur during donor storage, especially when exposed to increased temperatures and spending time at these increased temperatures. Crystals formed in the donor can transfer to final prints, leading to defects.

FIG. 1 illustrates crystal formation comparison 100 between a prior art yellow donor 102 and the yellow donor 104 of the present disclosure. The left two boxes show a yellow print of a prior art yellow donor 102 at 50- and 200-times magnification. The right two boxes show a print of the yellow donor 104 of the present disclosure at similar magnifications. As can be seen in the prior art yellow donor representation, a crystals 106 can cause discoloration of the yellow donor 102 in areas of high concentration. Additionally, the crystals 106 can create visible artifacts in the image at the locations of the discoloration.

Figure 2:
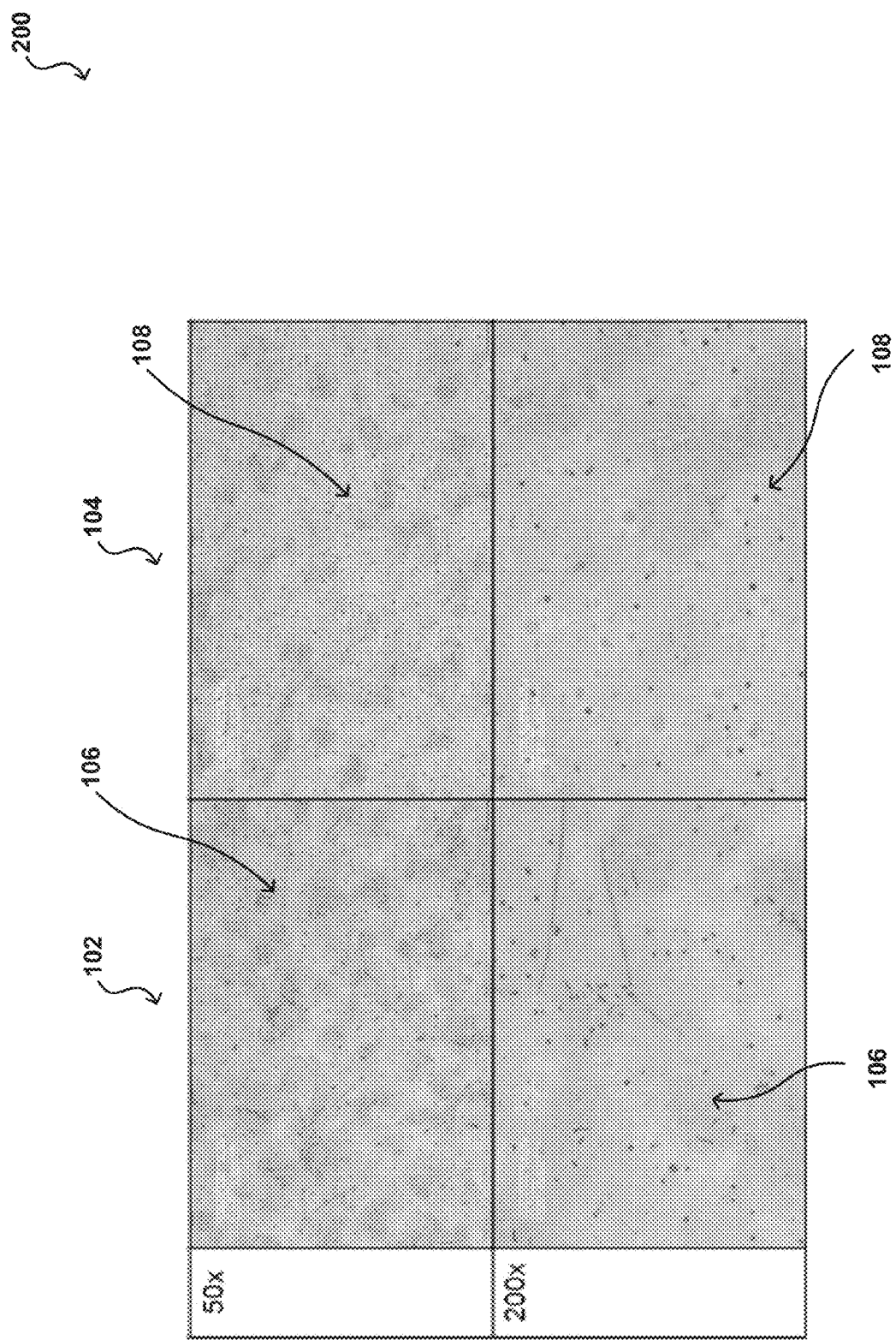
FIG. 2 illustrates a representation of a comparison between a prior art yellow donor and a yellow donor, in accordance with embodiments of the present disclosure.

In contrast, the yellow donor 104 of the present disclosure shows significantly reduced discoloration and visible crystals 108 within the image. FIG. 2 illustrates a second comparison 200 between the prior art and embodiments of the present disclosure. As with FIG. 1, the left two boxes are the prior art yellow donor 102, and the right two boxes are the yellow donor 104 of the present disclosure. Again, the current formulation can result in reduced discoloration and visible crystals 106, 108 within the final product.

Magenta Donor Formulation

A second embodiment of the present disclosure provides for a magenta donor with reduced defects and greater vibrancy. The magenta donor can be comprised of a solvent mixture of approximately 79% toluene, 20% methanol, and 1% cyclopentanone. In addition to the solvent mixture, the magenta donor can have a formulation according to Table 2 below. Units are provided in mg/ft2 which is an indication of surface density of the various aspects of the magenta donor. The values are based on a single laydown of the donor onto a print medium. The thickness of the single laydown of the donor can be between about 0.25 to 0.74 microns.

TABLE 2

|  | Minimum | Maximum |
| --- | --- | --- |
| First Magenta Dye | 7.83 mg/ft$^2$ | 10.35 mg/ft$^2$ |
| Second Magenta Dye | 7.83 mg/ft$^2$ | 10.35 mg/ft$^2$ |
| Third Magenta Dye | 0.85 mg/ft$^2$ | 1.15 mg/ft$^2$ |
| Cellulose Acetate Propionate | 17.39 mg/ft$^2$ | 23.00 mg/ft$^2$ |
| Plasticizer | 4.81 mg/ft$^2$ | 6.36 mg/ft$^2$ |
| Spacer Beads | 0.687 mg/ft$^2$ | 0.909 mg/ft$^2$ |

The first magenta dye can have a CAS number of 186030-51-3. The chemical structure of the first magenta dye can be:

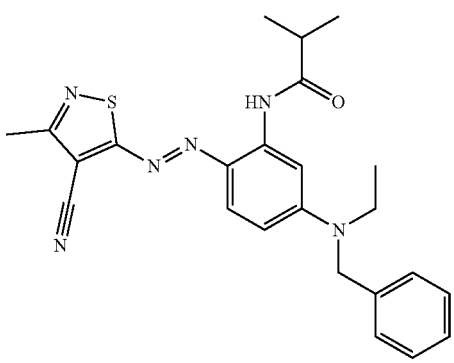 [SMILES: CCN(Cc1ccccc1)c1ccc(/N=N/c2snc(C)c2C#N)c(NC(=O)C(C)C)c1]

The second magenta dye can have a CAS number of 112940-69-9. The chemical structure of the second magenta dye can be:

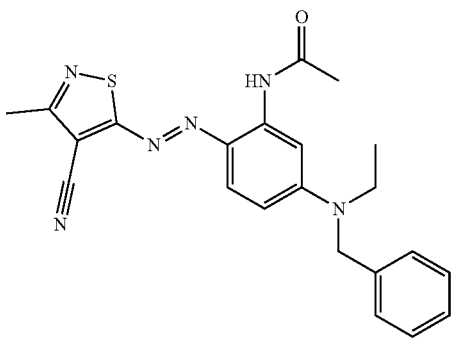 [SMILES: CCN(Cc1ccccc1)c1ccc(/N=N/c2snc(C)c2C#N)c(NC(C)=O)c1]

The third magenta dye can have a CAS number of 509-34-2. The chemical structure of the third magenta dye can be:

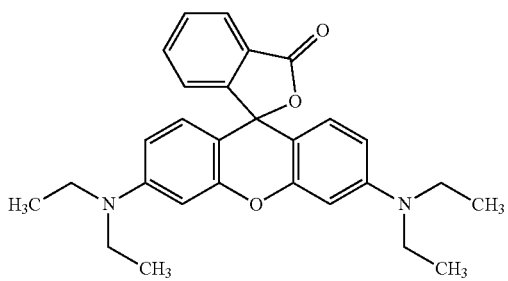 [SMILES: CCN(CC)c1ccc2c(c1)Oc1cc(N(CC)CC)ccc1C21OC(=O)c2ccccc21]

The cellulose acetate propionate can be used to form a film for the donor. The cellulose acetate propionate can be CAP-482-20. The cellulose acetate propionate can include approximately 48% propionyl by weight, 1.7% hydroxyl by weight, and 1.3% acetyl by weight.

The plasticizer can be high molecular weight plasticizer. The plasticizer can be Paraplex G-25. The Paraplex G-25 can be a polyester sebacate.

The spacer beads can be resin particles within the donor. The spacer beads can have an average particle diameter of about 0.5-6 microns. In some embodiments, the spacer beads can have an average particle diameter of about 0.5-3.05 microns.

Similar to the prior art yellow donor, the prior art magenta donor can also form crystals under specific environmental factors. In the prior art magenta donor, large crystal formation may occur the when the dye ratios are unoptimized. The addition of the third magenta dye can reduce crystallization under these conditions.

Figure 3:
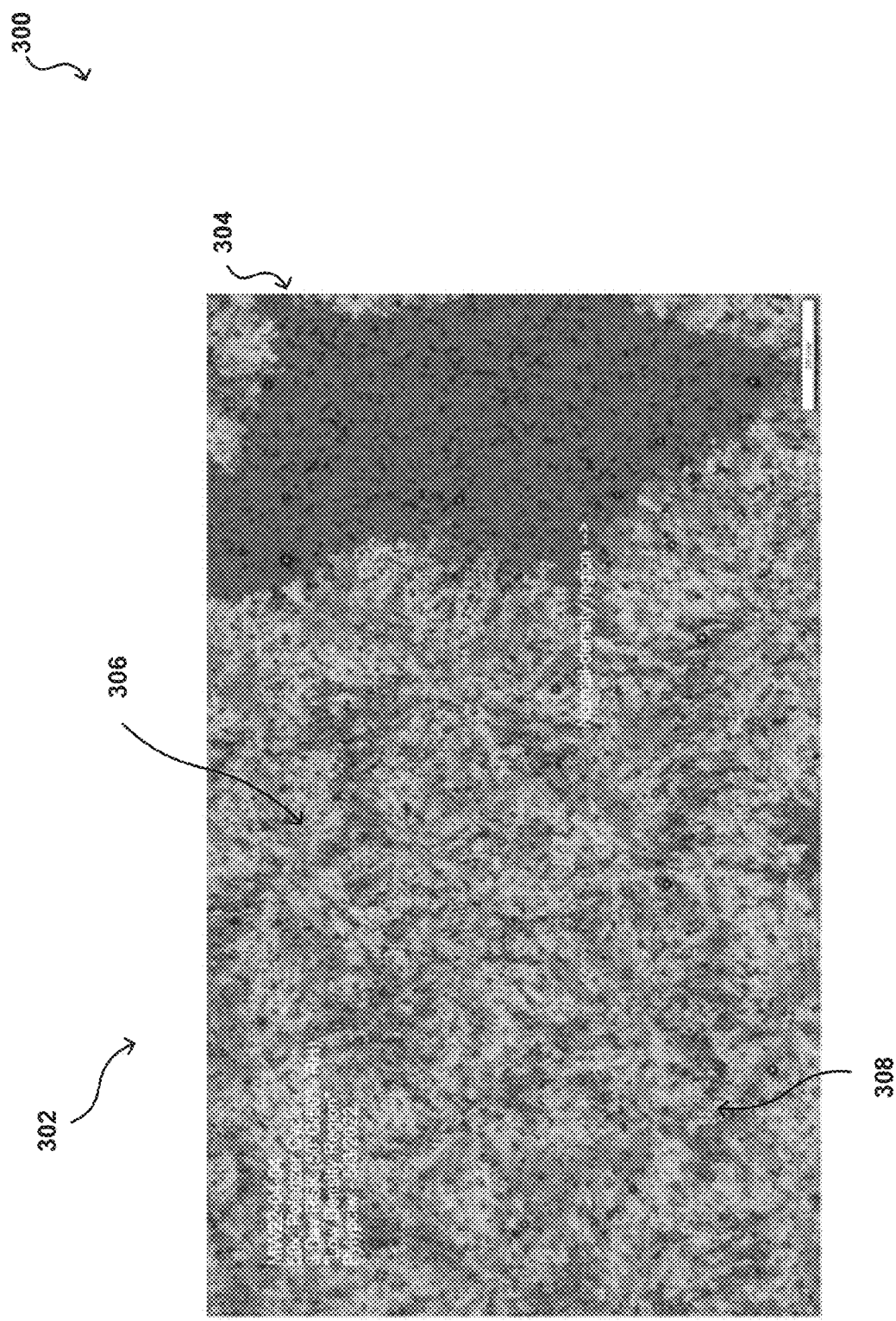
FIG. 3 illustrates a representation of crystals in a prior art donor.

FIG. 3 illustrates an example representation 300 of the results of large crystal formation in a prior art donor 302. The identified area 304 to the right side of FIG. 3 illustrates a normal density region of donor on the image. The central 306 and left areas 308 of FIG. 3 illustrate low density regions that are the result of large crystal formation.

Figure 4:
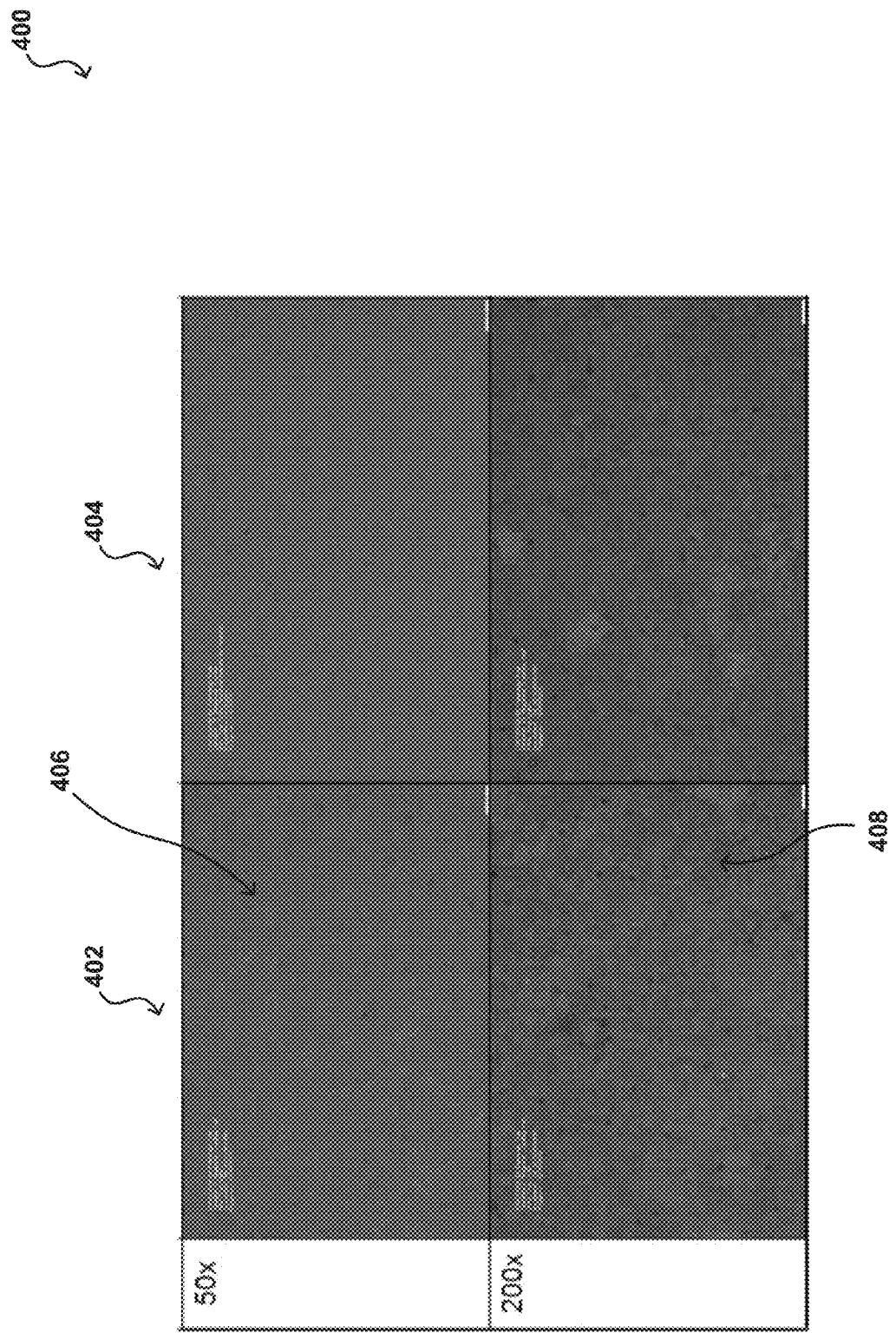
FIG. 4 illustrates a representation of a comparison between a prior art magenta donor and a magenta donor, in accordance with embodiments of the present disclosure.

FIG. 4 illustrates crystal formation comparison 400 between a prior art magenta donor 402 and the magenta donor 404 of the present disclosure. The left two boxes show a magenta print of a prior art donor 402 at 50- and 200-times magnification. The right two boxes show a print of the magenta donor 404 of the present disclosure at similar magnifications. The prior art donor 402 on the left shows greater discoloration 406 and crystal formation 408 than the magenta donor 404 of the present disclosure.

Figure 5:
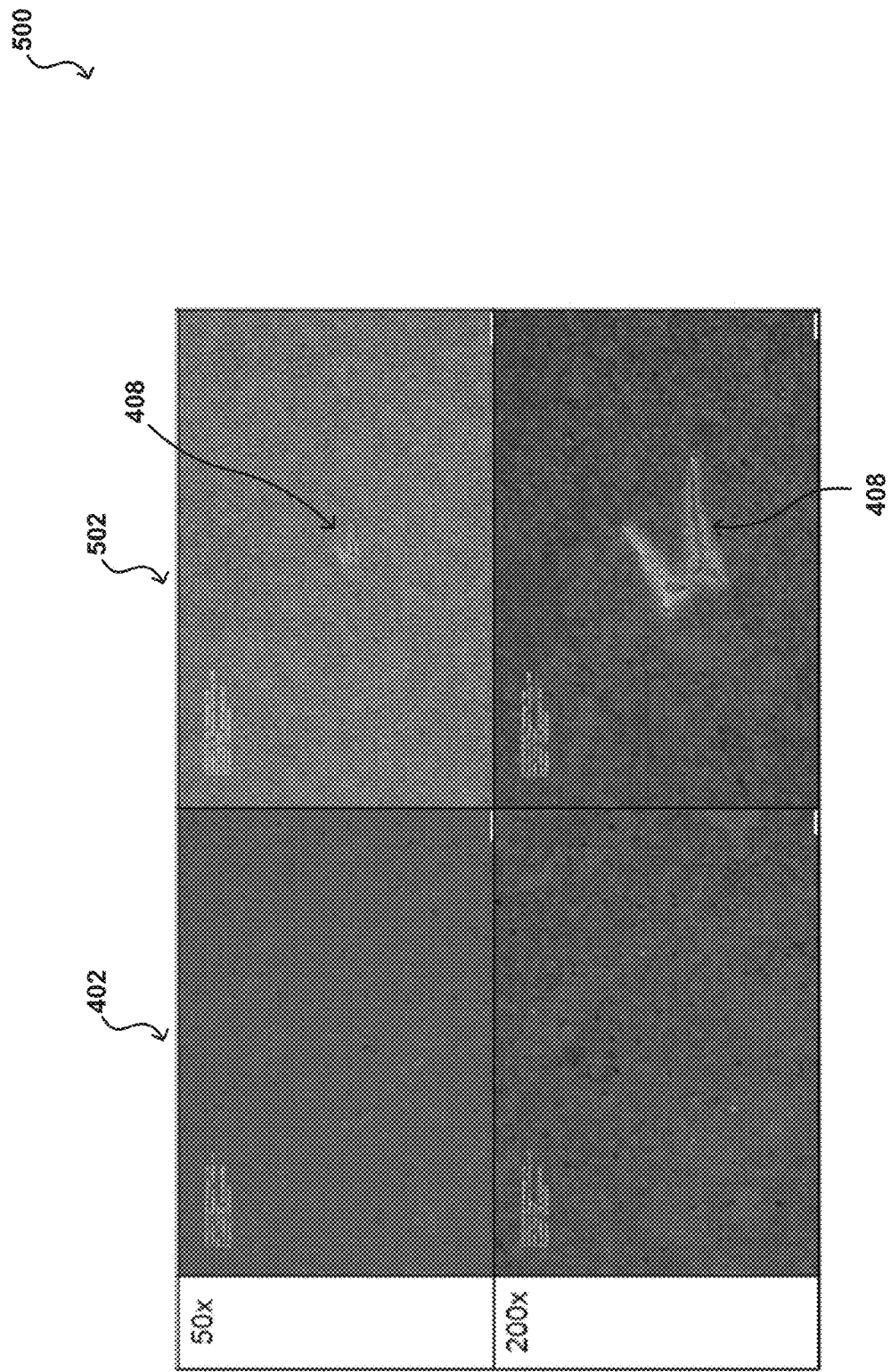
FIG. 5 illustrates a representation of a comparison between a prior art magenta donor and a magenta donor including two dyes, in accordance with embodiments of the present disclosure.

FIG. 5 illustrates a representation 500 of the improvement in the magenta donor 504 of the present disclosure made by the addition of the third magenta dye to the formulation. The prior art magenta donor 402 is shown in the left two boxes at 50- and 200-times magnification, but FIG. 5 illustrates a magenta donor 502 without the addition of the third magenta dye in the right two boxes at a similar magnification. While discoloration is improved from the prior art donor 402, without the addition of the third magenta tie, as shown in the magenta donor 402, crystals 408 are visible. The addition of the third magenta dye, as illustrated in FIG. 4 can reduce the crystallization shown in FIG. 5.

Figure 6:
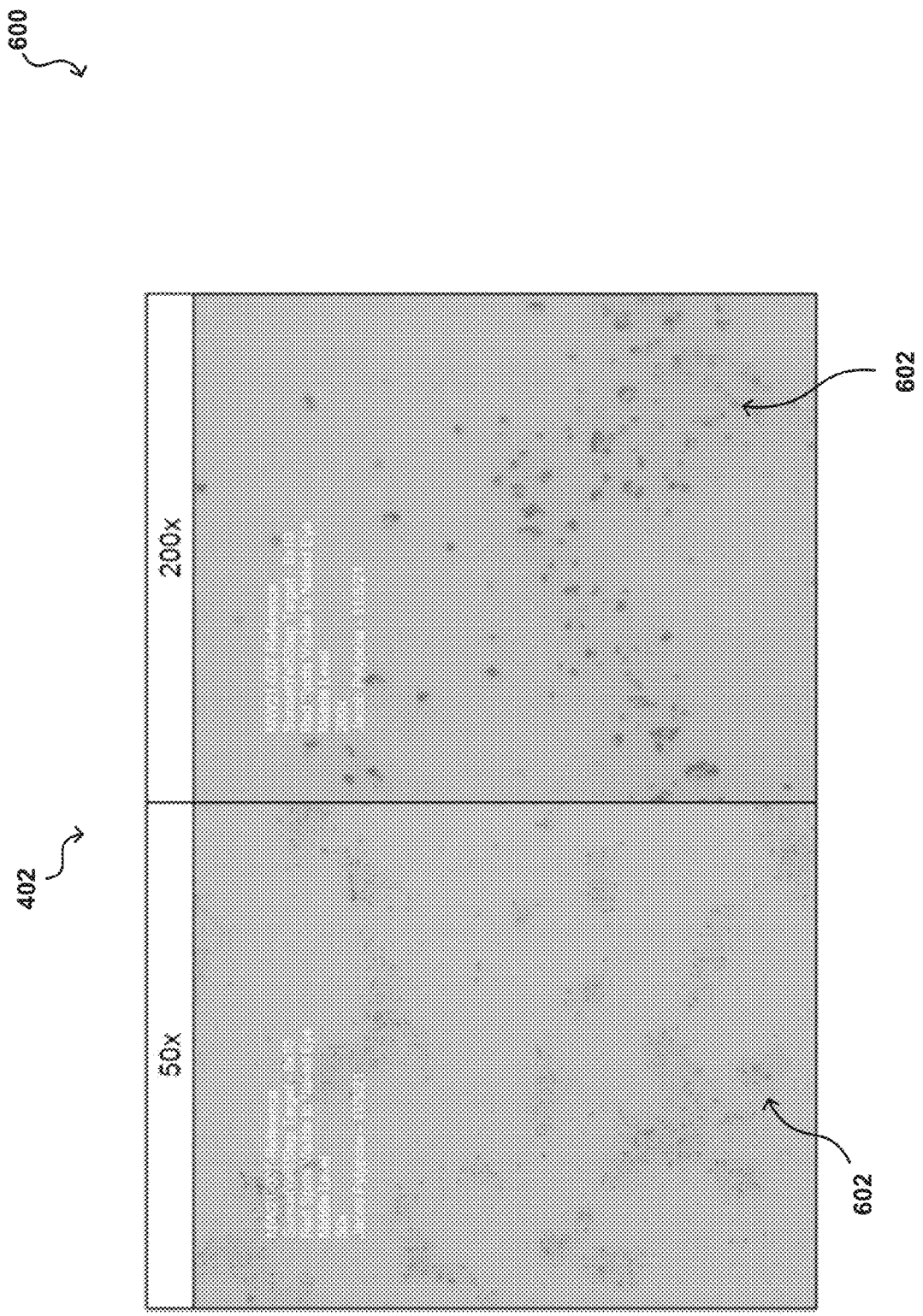
FIG. 6 illustrates a representation of red spots in a prior art donor.

Further, the prior art magenta donor 402 can produce red spots on prints due to previous formulations. FIG. 6 illustrates a representation 600 of red spots 602 at 50- and 200-times magnification present in prior art magenta donors 402. These red spots 602 can be visible to the naked eye and can be present due to a previously used donor combinations.

Figure 7:
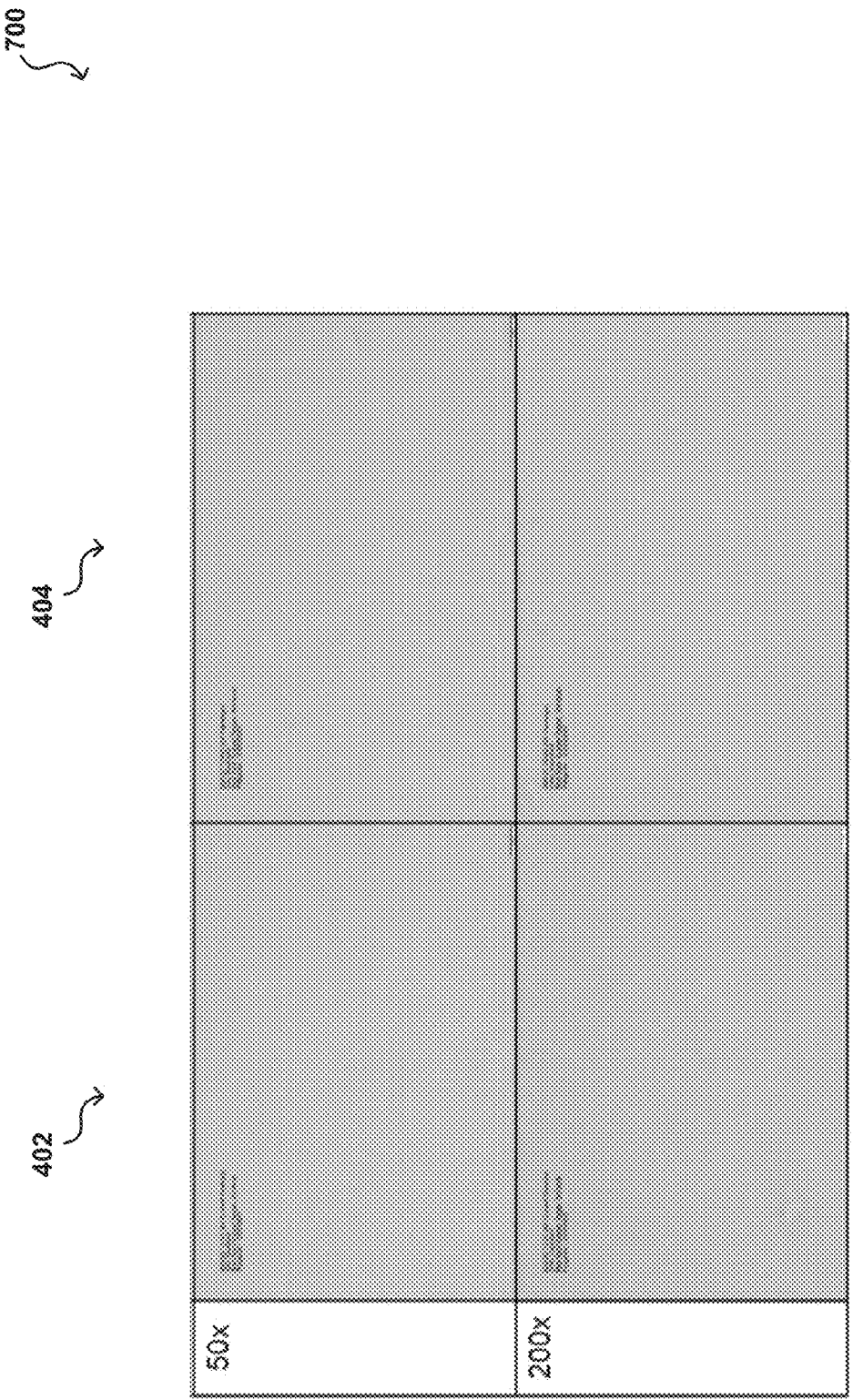
FIG. 7 illustrates a representation of a comparison between a prior art magenta formulation and a magenta formulation, in accordance with embodiments of the present disclosure.

FIG. 7 illustrates a comparison 700 between the prior art magenta donor 402 and the magenta donor 404 of the present disclosure. The left two boxes show a magenta print of the prior art donor 402 at 50- and 200-times magnification. The right two boxes show a print of the magenta donor 404 of the present disclosure at similar magnifications. As depicted in FIG. 7, the present magenta donor 404 produces reduced red spot discoloration due to the updated donor formulation.

Improved Vividness

The combination of the disclosed magenta and yellow donors can result in a color spectrum with increased vividness. Vividness is calculated using the equation, $V^* = \sqrt{L^2 + a^2 + b^2}$ where a is the axis relative to red and green colors, b is the axis relative to blue and yellow colors, and L is a lightness value. The resulting $V^*$ value is a vector length within the three-dimensional (3D) color space.

A second measurement of color is gamut. Gamut measures the range of colors and tones achievable by an imaging system in the three-dimensional space of L, a, and b. A gamut measurement produces a volumetric value indicating the range of colors that can be produced. In general, a higher gamut value results in a greater vividness due to the greater range of colors which can be produced.

Vividness and gamut are measured in the CIELAB color space as defined by the International Commission on Illumination in 1976. The CIELAB space is 3D and covers the entire gamut of human color perception. It is based on the opponent color model of human vision, where red and green form an opponent pair and blue and yellow form an opponent pair. The lightness value, L, defines black at 0 and white at 100. The a axis is relative to the green-red opponent colors, with negative values toward green and positive values toward red. The b axis represents the blue-yellow opponents, with negative numbers toward blue and positive toward yellow. The a and b axes are unbounded and depending on the reference white they can easily exceed ±150 to cover the human gamut. Nevertheless, software implementations often clamp these values for practical reasons. For instance, if integer math is being used it is common to clamp a and b in the range of −128 to 128.

The magenta donor of the current disclosure can have a vividness value of up to 88 linear CIELAB units. Additionally, the magenta donor of the current disclosure can have a hue sector gamut of up to 185,738 cubic CIELAB units. The combination of magenta and yellow can result in a red with a vividness value of up to 91 linear CIELAB units.

Figure 8:
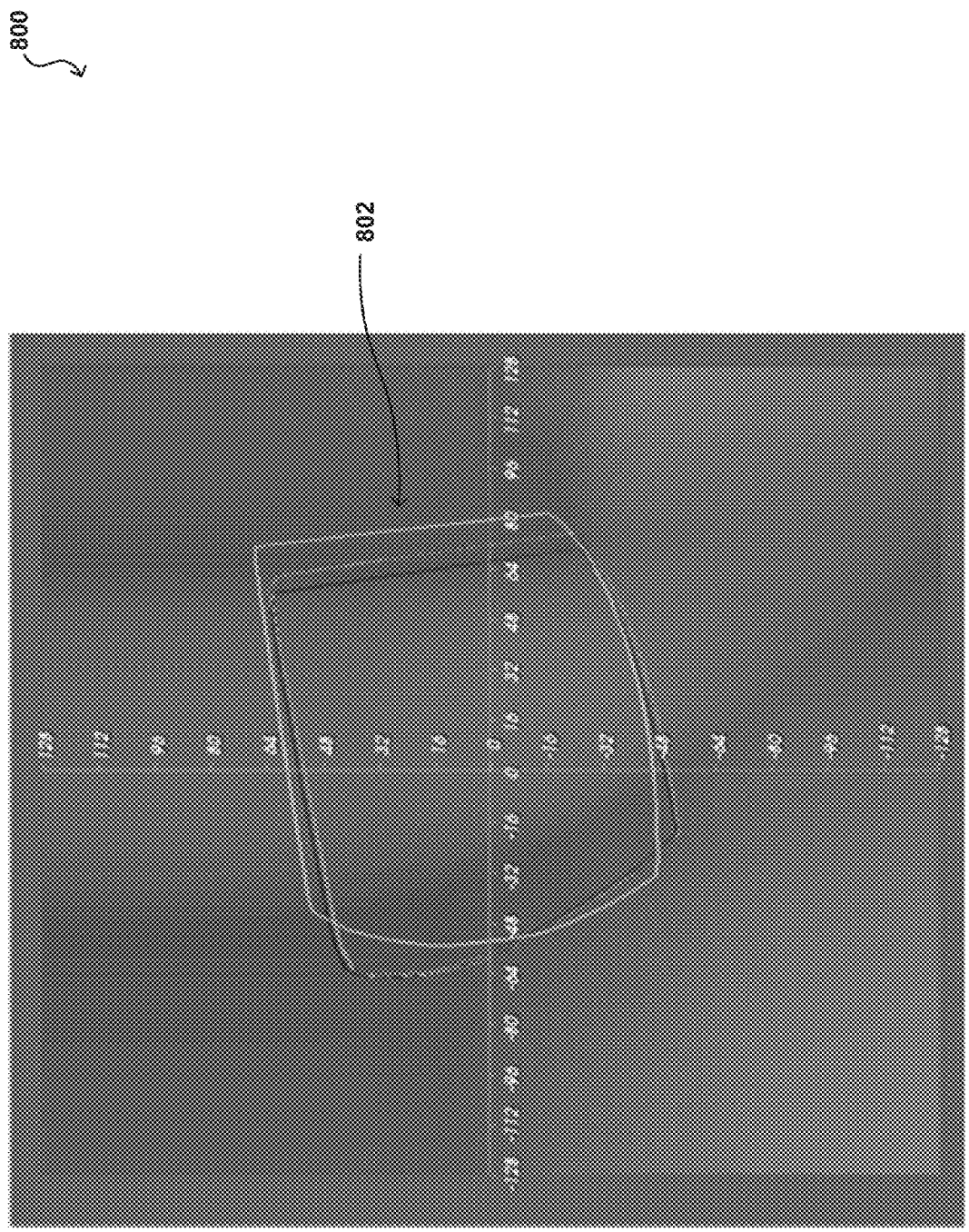
FIG. 8 illustrates a CIELAB color space showing a vividness range of magenta and yellow combinations at a value of L=45.

FIG. 8 illustrates a CIELAB color space 800 showing the vividness range of the magenta and yellow combinations at a value of L=45. A box 802 illustrates a two-dimensional (2D) representation of the 3D color gamut of the magenta and yellow dyes. The indicated box 802 extends further into the magenta and red color hues, depicting the increased vividness of those colors.

Figure 9:
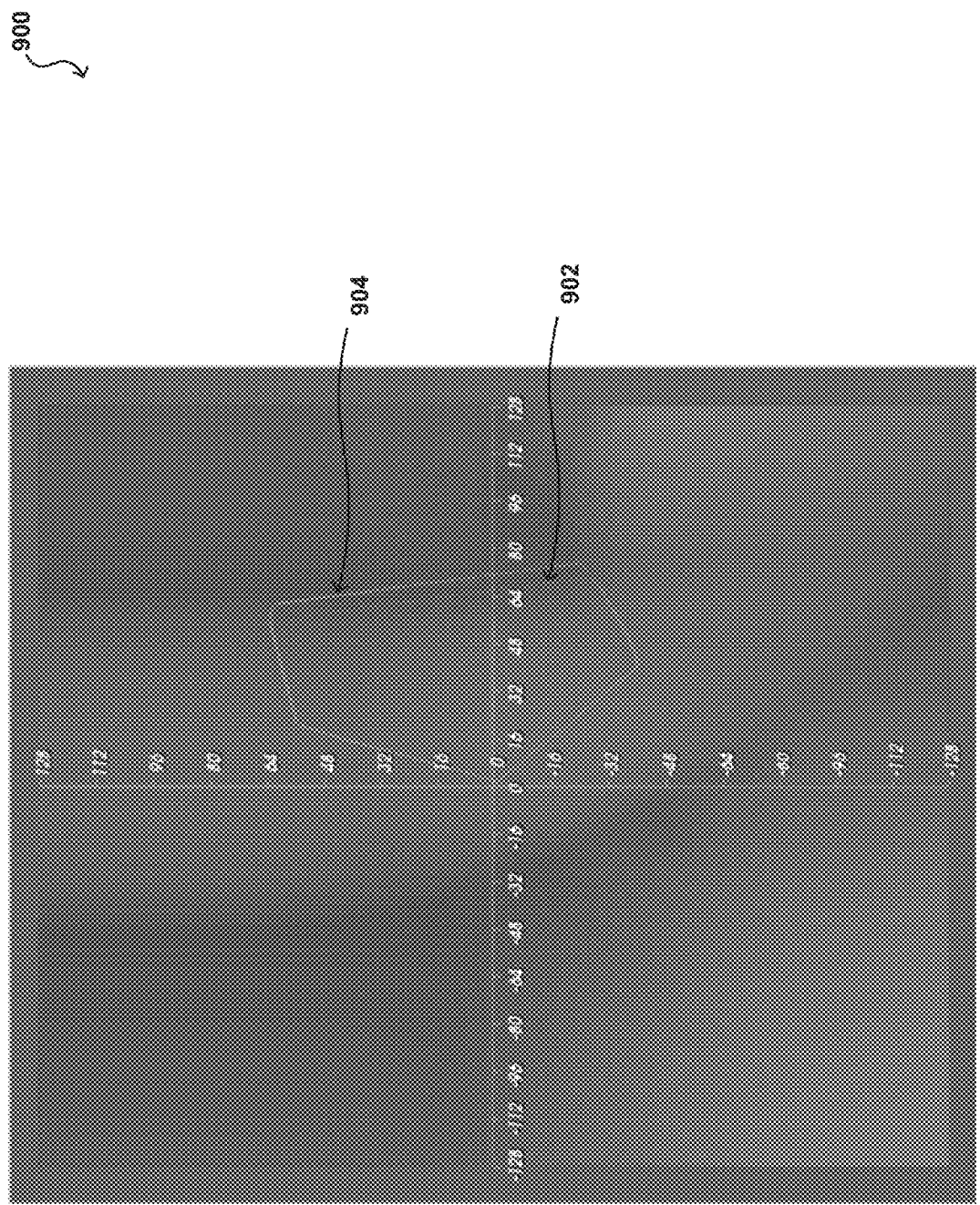
FIG. 9 illustrates a CIELAB color space showing a comparison of vividness ranges between a prior art formulation and a current formulation at a value of L=50.

FIG. 9 illustrates a representation 900 of differences between a prior art yellow and magenta donor vividness and the donors of the present disclosure. A blue box 902 shows the vividness range of a prior art donor combination. The prior art can have a gamut of up to 171,918 cubic CIELAB units. In comparison, a green box 904 indicates the vividness range of the present disclosure. As shown, the combination of the present disclosure can have a hue sector gamut of up to 185,738 cubic CIELAB units.

Embodiments of the present disclosure have been described in detail with particular reference to certain embodiments thereof, but it will be understood that variations and modifications can be affected within the spirit and scope of the disclosure.

The invention claimed is:

1. A yellow donor, comprising:
   a solvent mixture of toluene, methanol, and cyclopentanone;
   between about 12.40 and 16.40 mg/ft² of a first yellow dye;
   between about 3.67 and 4.85 mg/ft² of a second yellow dye;
   between about 1.74 and 2.30 mg/ft² of a third yellow dye;
   between about 16.57 and 21.92 mg/ft² of a cellulose acetate propionate;
   between about 2.61 and 3.45 mg/ft² of a plasticizer;
   between about 0.296 and 0.391 mg/ft² of spacer beads; and
   wherein the first yellow dye has a structure of:

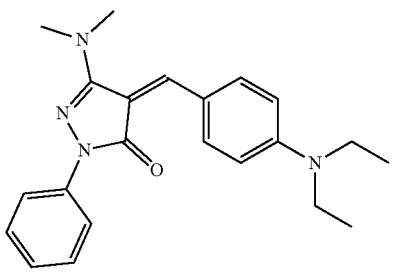 [SMILES: CCN(CC)c1ccc(/C=C2\C(=O)N(c3ccccc3)N=C2N(C)C)cc1]

the second yellow dye has a structure of:

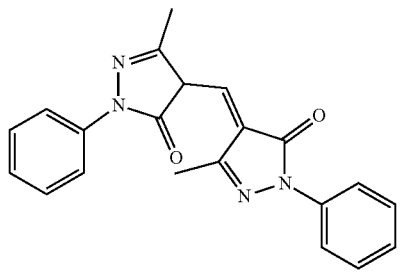 [SMILES: CC1=NN(c2ccccc2)C(=O)/C1=C/C1C(=O)N(c2ccccc2)N=C1C]

and the third yellow dye has a structure of:

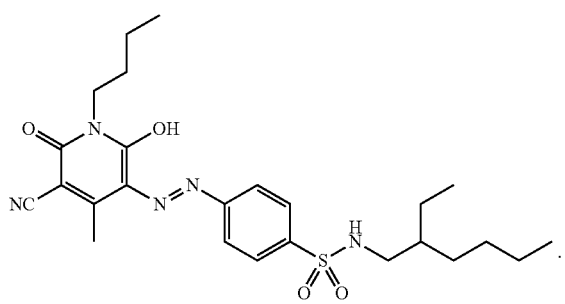 [SMILES: CCCCC(CC)CNS(=O)(=O)c1ccc(/N=N/c2c(C)c(C#N)c(=O)n(CCCC)c2O)cc1]

2. The yellow donor of claim 1, wherein the solvent mixture includes a composition of approximately 79% toluene, approximately 20% methanol, and approximately 1% cyclopentanone.

3. The yellow donor of claim 1, wherein the yellow donor is applied as a single laydown onto a print medium with a thickness of between about 0.25 and 0.74 microns.

4. The yellow donor of claim 1, wherein the cellulose acetate includes approximately 48% propionyl by weight, 1.7% hydroxyl by weight, and 1.3% acetyl by weight.

5. The yellow donor of claim 1, wherein the plasticizer is Paraplex G-25.

6. The yellow donor of claim 1, wherein the spacer beads comprise resin particles.

7. The yellow donor of claim 6, wherein the resin particles have an average particle diameter between about 0.5-6 microns.

8. The yellow donor of claim 6, wherein the resin particles have an average particle diameter between about 0.5-3.05 microns.

9. A magenta donor, comprising:
   a solvent mixture of toluene, methanol, and cyclopentanone;
   between about 7.83 and 10.35 mg/ft² of a first magenta dye;
   between about 7.83 and 10.35 mg/ft² of a second magenta dye;
   between about 0.85 and 1.15 mg/ft² of a third magenta dye;

between about 17.39 and 23.00 mg/ft² of a cellulose acetate propionate;

between about 4.81 and 6.36 mg/ft² of a plasticizer;

between about 0.687 and 0.909 mg/ft² of spacer beads; and wherein the first magenta dye has a structure of:

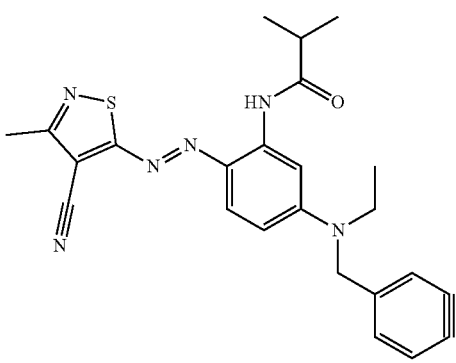 [SMILES: CCN(Cc1cc#ccc1)c1ccc(/N=N/c2snc(C)c2C#N)c(NC(=O)C(C)C)c1]

the second magenta dye has a structure of:

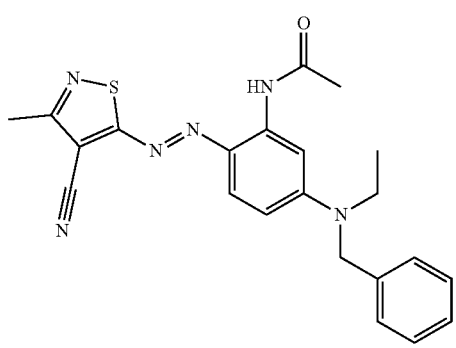 [SMILES: CCN(Cc1ccccc1)c1ccc(/N=N/c2snc(C)c2C#N)c(NC(C)=O)c1]

and the third magenta dye has a structure of:

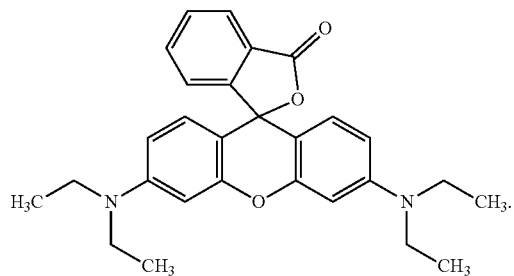 [SMILES: CCN(CC)c1ccc2c(c1)Oc1cc(N(CC)CC)ccc1C21OC(=O)c2ccccc21]

10. The magenta donor of claim 9, wherein the solvent mixture includes a composition of approximately 79% toluene, approximately 20% methanol, and approximately 1% cyclopentanone.

11. The magenta donor of claim 9, wherein the magenta donor is applied as a single laydown onto a print medium with a thickness of between about 0.25 and 0.74 microns.

12. The magenta donor of claim 9, wherein the cellulose acetate includes approximately 48% propionyl by weight, 1.7% hydroxyl by weight, and 1.3% acetyl by weight.

13. The magenta donor of claim 9, wherein the plasticizer is Paraplex G-25.

14. The magenta donor of claim 9, wherein the spacer beads comprise resin particles.

15. The magenta donor of claim 12, wherein the resin particles have an average particle diameter between about 0.5-6 microns.

16. The magenta donor of claim 12, wherein the resin particles have an average particle diameter between about 0.5-3.05 microns.

17. A red color representation, comprising:

a combination of a magenta donor and a yellow donor, wherein the magenta donor has a vividness of up to 88 linear CIELAB units and a hue sector gamut of up to 185,738 cubic CIELAB units and the red color has a vividness of up to 91 linear CIELAB units, and wherein the yellow donor comprises:

a solvent mixture of toluene, methanol, and cyclopentanone;

between about 12.40 and 16.40 mg/ft² of a first yellow dye;

between about 3.67 and 4.85 mg/ft² of a second yellow dye;

between about 1.74 and 2.30 mg/ft² of a third yellow dye;

between about 16.57 and 21.92 mg/ft² of a cellulose acetate propionate;

between about 2.61 and 3.45 mg/ft² of a plasticizer;

between about 0.296 and 0.391 mg/ft² of spacer beads; and wherein the first yellow dye has a structure of:

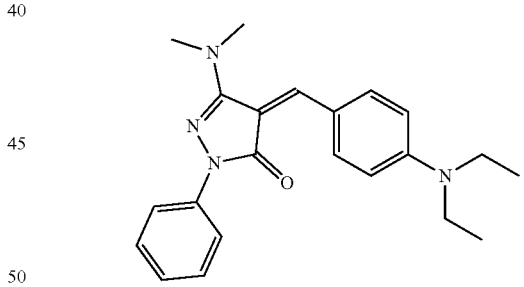

the second yellow dye has a structure of:

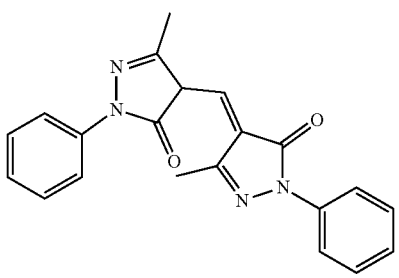 [SMILES: CC1=NN(c2ccccc2)C(=O)/C1=C/C1C(=O)N(c2ccccc2)N=C1C]

and the third yellow dye has a structure of:

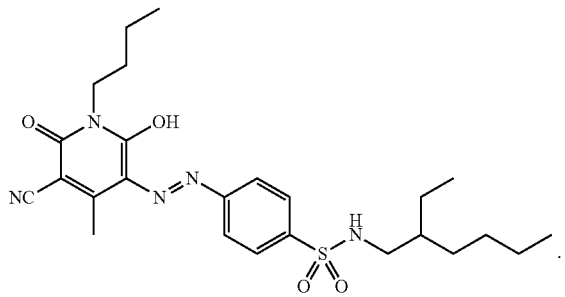 [SMILES: CCCCC(CC)CNS(=O)(=O)c1ccc(/N=N/c2c(C)c(C#N)c(=O)n(CCCC)c2O)cc1]

18. The red color representation of claim 17, wherein the magenta donor comprises:
   a solvent mixture of toluene, methanol, and cyclopentanone;
   between about 7.83 and 10.35 mg/ft² of a first magenta dye;
   between about 7.83 and 10.35 mg/ft² of a second magenta dye;
   between about 0.85 and 1.15 mg/ft² of a third magenta dye;
   between about 17.39 and 23.00 mg/ft² of a cellulose acetate propionate;
   between about 4.81 and 6.36 mg/ft² of a plasticizer;
   between about 0.687 and 0.909 mg/ft² of spacer beads; and
   wherein the first magenta dye has a structure of:

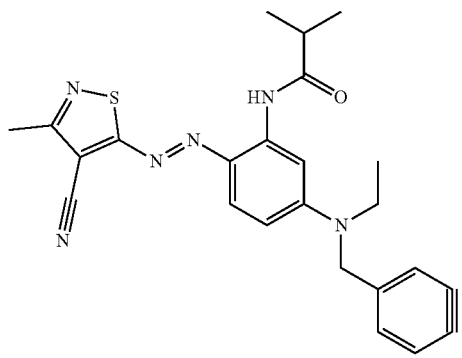 [SMILES: CCN(Cc1cc#ccc1)c1ccc(/N=N/c2snc(C)c2C#N)c(NC(=O)C(C)C)c1]

the second magenta dye has a structure of:

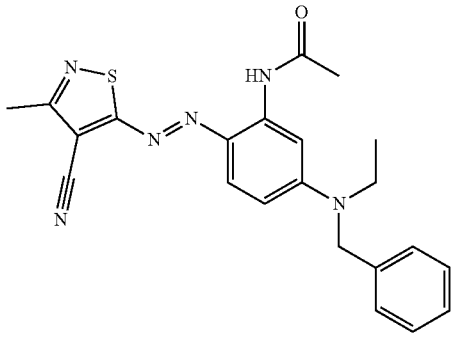 [SMILES: CCN(Cc1ccccc1)c1ccc(/N=N/c2snc(C)c2C#N)c(NC(C)=O)c1]

and the third magenta dye has a structure of:

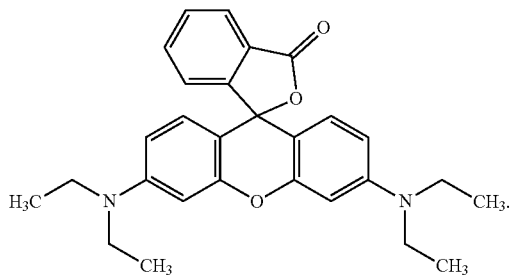 [SMILES: CCN(CC)c1ccc2c(c1)Oc1cc(N(CC)CC)ccc1C21OC(=O)c2ccccc21]

19. The red color representation of claim 17, wherein the red color representation is provided as colored material to a receiver element for deposition onto a surface.

* * * * *